(12) United States Patent
Gómez García et al.

(10) Patent No.: US 12,738,884 B2
(45) Date of Patent: Sep. 15, 2026

(54) CONNECTION SYSTEM OF A TRANSMISSION ROD FOR SOLAR TRACKERS

(71) Applicant: TRINA SOLAR, S.L.U., Madrid (ES)

(72) Inventors: Juan Manuel Gómez García, Madrid (ES); Miguel Espejo Labao, Madrid (ES); Daniel González García, Madrid (ES)

(73) Assignee: TRINA SOLAR SPAIN, S.L.U., Madrid (ES)

( * ) Notice: Subject to any disclaimer, the term of this patent is extended or adjusted under 35 U.S.C. 154(b) by 298 days.

(21) Appl. No.: 18/495,315

(22) Filed: Oct. 26, 2023

(65) Prior Publication Data

US 2024/0162852 A1 May 16, 2024

(30) Foreign Application Priority Data

Nov. 11, 2022 (ES) ............................... U 202231874

(51) Int. Cl.
*H02S 20/32* (2014.01)
*F16D 3/26* (2006.01)
*F24S 30/425* (2018.01)
*F24S 30/00* (2018.01)

(52) U.S. Cl.
CPC ................ *H02S 20/32* (2014.12); *F16D 3/26* (2013.01); *F24S 30/425* (2018.05); *F24S 2030/12* (2018.05); *F24S 2030/136* (2018.05); *Y02E 10/47* (2013.01); *Y10T 74/19112* (2015.01); *Y10T 403/7041* (2015.01)

(58) Field of Classification Search
CPC H02S 20/32; F16D 3/26; F24S 30/425; F24S 2030/12; F24S 2030/136; Y02E 10/47; Y10T 74/19112; Y10T 403/7041
USPC ......... 464/114, 155, 162; 74/665 S; 403/362
See application file for complete search history.

(56) References Cited

U.S. PATENT DOCUMENTS 4,460,182 A * 7/1984 Brissette ................ F16D 3/843 464/162
11,632,014 B2 * 4/2023 Kisla ...................... H02K 7/003
11,764,724 B2 * 9/2023 Duan .................... F24S 30/425 136/246

* cited by examiner

*Primary Examiner* — Greg Binda
(74) *Attorney, Agent, or Firm* — LUCAS & MERCANTI, LLP

(57) ABSTRACT

A solar tracker connection system includes a first rotatable row of solar panels that includes a first rotation shaft, a first set of solar panels coupled to the main rotation shaft, a first motorized rotation module, and a first universal joint, a second rotatable row of solar panels that includes a second rotation shaft, a second set of solar panels coupled to the second rotation shaft, a second rotation module having no motor, and a second universal joint. The system also includes a transmission rod connected to the first universal joint and to the second universal joint, wherein the transmission rod enables the first motorized rotation module of the first row of solar panels to control the movement of the second row of solar panels via the second rotation module.

4 Claims, 8 Drawing Sheets

1
3
3'
4
4'
5
5'

CONNECTION SYSTEM OF A TRANSMISSION ROD FOR SOLAR TRACKERS

CROSS-REFERENCE TO RELATED APPLICATION

This application claims priority of Spanish Application No. 202231874, filed Nov. 11, 2022, the contents of which is incorporated herein by reference.

TECHNICAL SECTOR

The present invention relates to the industry dedicated to solar trackers for photovoltaic solar panels, and more specifically to the connection system of the transmission rod of solar trackers with at least two rows of solar panels.

STATE OF THE ART

To achieve an effective transmission of the movement and better adaptability to the different terrain in which solar trackers can be installed, solutions are known in which motorised rotation modules are used to drive the rotation shafts of the solar trackers, which are connected to other rows by means of transmission rods that transmit the movement of the motorised rotation module to a driven shaft of the adjacent solar tracker. The rotation of all the solar panels is thereby synchronised and they adapt with greater ease to the terrain.

An example of this type of solution is found in the Utility Model document ES1271451, which deals with a solar tracker with a transmission rod that connects two rows of solar trackers, connected by universal joints to the corresponding rotation modules of each row of solar trackers. Said rod being a rod with a circular cross section made up of at least two rods joined by an intermediate junction that allows the distance to be adjusted in the assembly of the transmission rod by means of slotted holes.

However, the problem arises that there are difficulties during assembly derived from the necessary junctions between the different parts of the rod for the fastening thereof to the universal connection to the rotation module, and due to the numerous screws to be used for the fastening between the parties.

In light of the described disadvantage or limitation of the currently existing solutions, a solution is necessary that allows greater ease of assembly while providing a safe and effective transmission of movement.

OBJECT OF THE INVENTION

In order to meet this objective and solve the technical problems discussed so far, in addition to providing additional advantages that can be derived later, the present invention provides a connection system of a transmission rod for solar trackers with at least two rows of solar panels, the transmission rod of which connects a main rotation shaft with a rotation module with a motor to a driven shaft with a rotation module without a motor, said transmission rod being connectable to the rotation modules by means of universal joints that are fastened to the connection output of the rotation module, characterised in that the universal joint has at one end a connection corresponding to the connection output of the rotation module, and at the other end of the universal joint corresponding to a tubular connection output with a polygonal cross section for connection to the transmission rod, the transmission rod having a corresponding polygonal configuration, and with a first end of the transmission rod longitudinally slidably connectable to the connection output of a first universal joint and to a second end of the transmission rod fixedly connectable to the connection output of a second universal joint.

Due to this configuration, the assembly process is facilitated since fewer parts are used than in known solutions that have tube junctions. The torsional stresses are not absorbed by the screwed joints of the junctions or the screw fastenings of the rod to the universal joints as in the state of the art, but rather by the polygonal cross section of the rod and the connection output of the universal joint, said torque transmission is possible by eliminating the joining screws. The joint is provided with the longitudinally sliding connection between the rod and the universal joint connection output, the length of which is fastened with a fixed joint at the other end of the rod once connected to the other universal joint. In this way, a single rod is necessary instead of several sections, said rod with a polygonal cross section also having better mechanical behaviour than the rod with a circular cross section.

In turn, the reduction in screws and better mechanical behaviour prevent or reduce vibrations in the transmission of movement between rotation shafts, reducing maintenance and extending the useful life of the installation.

Preferably, the transmission rod with a polygonal cross section will be square, facilitating manufacturing and providing good mechanical behaviour.

According to a feature of the invention, the connection output of the first universal joint is adjustable by snap fit of the transmission rod. This snap fit facilitates assembly by adjusting the insertion of the transmission rod into the output of the universal joint to the desired length without movement during assembly. It is also contemplated that the adjustment length of the transmission rod at the outlet of the universal joint can be fastened by mechanical means according to predetermined positions.

Likewise, it is intended that the fastening of the connection outlet of the second universal joint is carried out by means of a through screw through a through hole of the connection outlet of the second universal joint coinciding with a through hole of the second end of the transmission rod. This means that, once the transmission rod is positioned with its sliding adjustment, it is easily fastened to prevent its longitudinal movement by simply positioning the through screw.

According to another aspect of the invention, the first universal joint is fastened to the connection outlet of the rotation module by means of a grub screw. This configuration provides a simple rod disconnection system that, by removing the grub screw, allows the adjustable universal joint to be released, allowing for simple disconnection, which facilitates maintenance.

DETAILED DESCRIPTION OF THE INVENTION

In light of the aforementioned figures, and in accordance with the adopted numbering, a non-limiting preferred exemplary embodiment of the invention can be seen therein, which comprises the parts and elements indicated and described in detail below.

Figure 1:
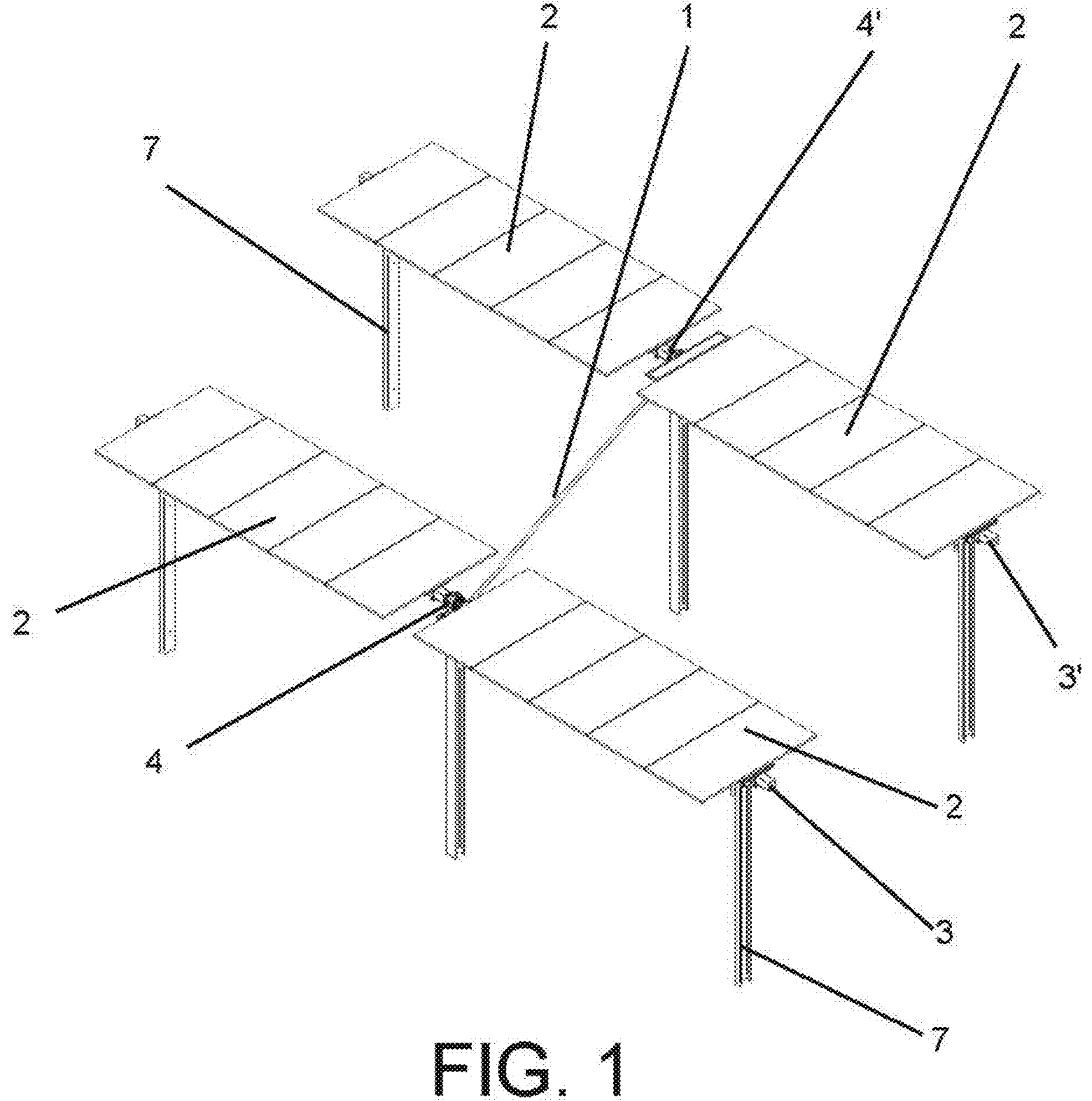
FIG. 1 shows a perspective view of a dual-row solar tracker with the transmission system object of the invention.

As can be seen in the perspective view of the general installation of solar panels in FIG. 1, due to the orography of the location and to synchronise the rotation of the solar panels (2) of solar trackers in which a rotation shaft (3, 3') supported on the ground by posts (7) transmits the movement to the solar panels (2) themselves; for the practical example of a dual-row tracker, a transmission rod (1) is used, which transmits the movement of rotation of a main rotation shaft (3) driven by a motorised rotation module (4), to a driven shaft (3') through its rotation module (4') without a motor.

Figures 2, 3:
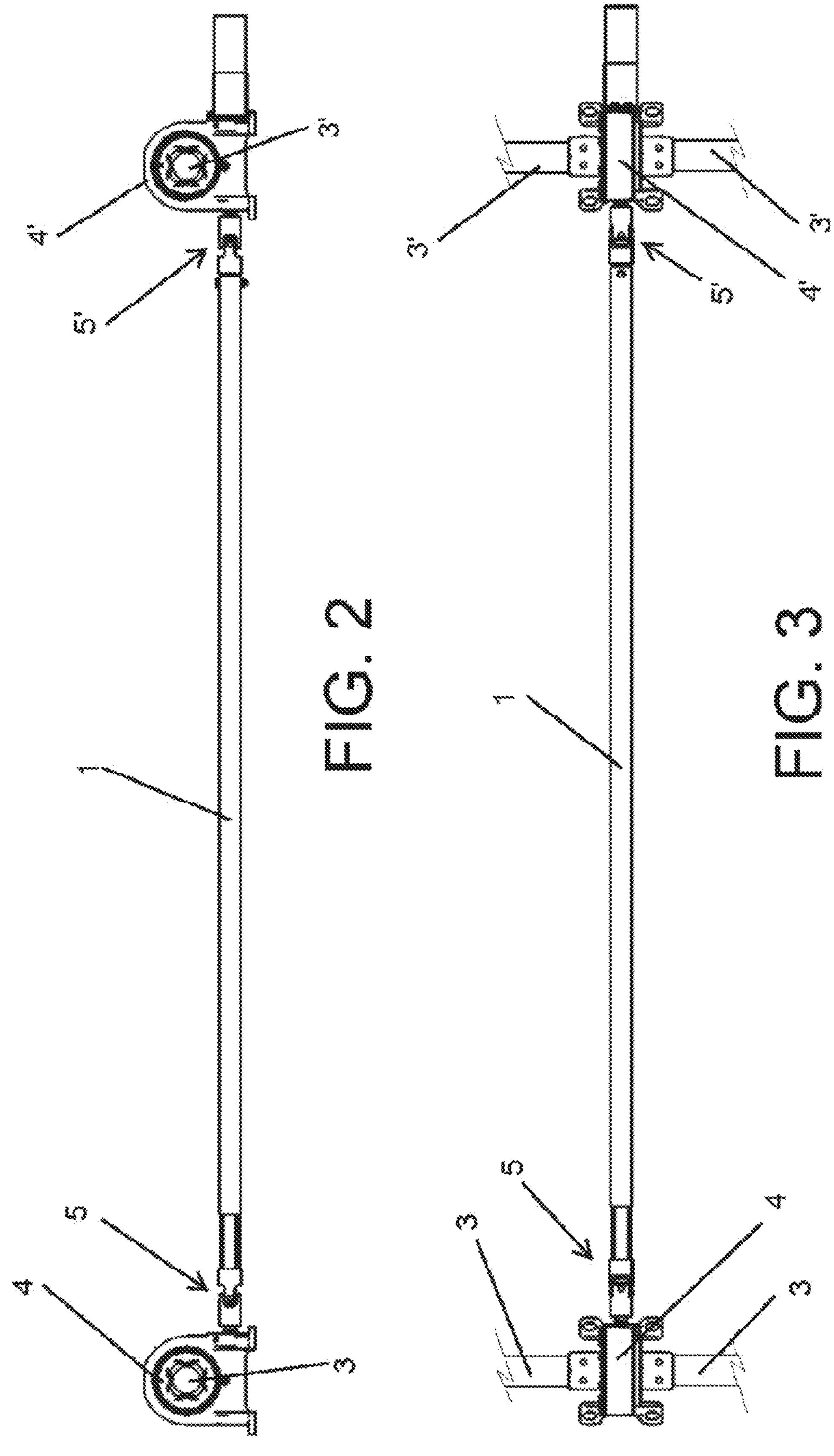
FIG. 2 shows an elevation view of a transmission rod for connecting a rotation module of a motorised rotation shaft to a rotation module of a driven rotation shaft for an example embodiment of the invention.
FIG. 3 shows a top view of the exemplary embodiment of FIG. 2.

In order for the transmission of movement to be smooth and without vibrations, the connection system of the transmission rod (1), as can be seen in FIGS. 2 and 3, comprises a first universal joint (5) for joining one end of the rod (1) to the motorised rotation module (4), and a second end of the rod (1) fastenable to the rotation module (4') of the driven shaft (3') by means of a second universal joint (5').

The particularity of this transmission rod (1) is its polygonal cross section configuration, specifically for the practical example shown in the figures, a square cross section.

Figure 4:
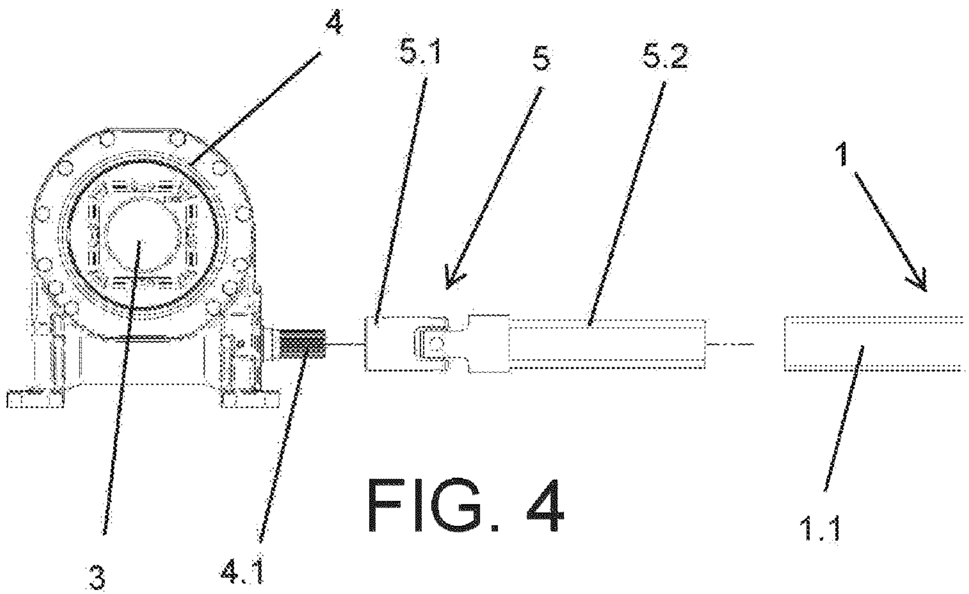
FIG. 4 shows an exploded elevation view of one end of the transmission rod joined to the rotation module by means of a first universal joint.

Thus, as can be seen in FIG. 4, the first universal joint (5) comprises a connection end (5.1) with a circular cross section corresponding to the connection output (4.1) of the motorised rotation module (4). This connection output (4.1) preferably has a grooved cylindrical configuration that facilitates the connection of the first universal joint (5) producing a correct transmission of the rotation movement.

Figure 5:
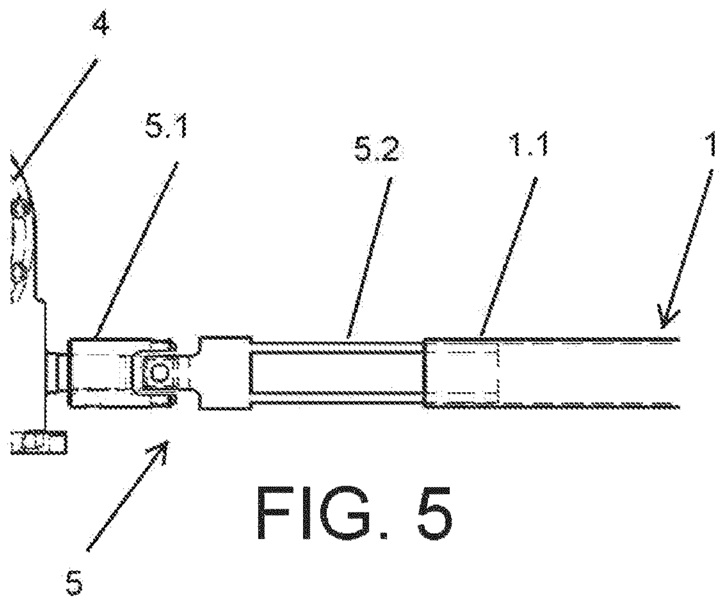
FIG. 5 shows a view like that of FIG. 4 in the assembled position.

As seen in FIGS. 4 and 5, at the other end of the first universal joint (5), it comprises a connection output (5.2) with a square cross section configuration corresponding to the square configuration of the transmission rod (1). A first end (1.1) of the transmission rod (1) thereby being slid longitudinally (in the longitudinal direction of the rod) onto the connection outlet (5.2) of the first universal joint (5). This connection between the transmission rod (1) and the connection output (5.2) of the first universal joint (5) will preferably be adjustable by pressure to facilitate assembly work, such that a prefastening is achieved that prevents the rod (1) from easily coming out of the connection output (5.2).

Figure 6:
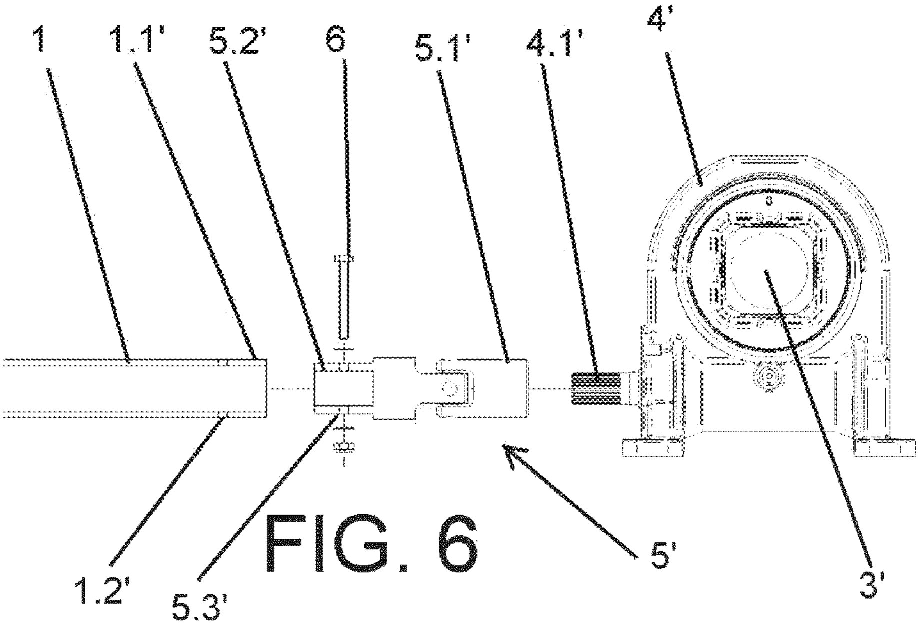
FIG. 6 shows an exploded elevation view of the other end of the transmission rod joined to the rotation module by means of a second universal joint.
Figure 7:
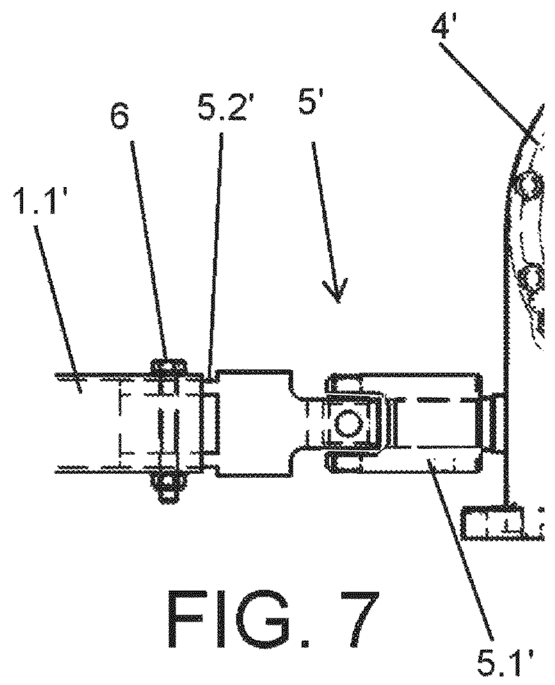
FIG. 7 shows a view like that of FIG. 6 in the assembled position.

Furthermore, and according to FIGS. 6 and 7, the connection system of the transmission rod (1) comprises a second universal joint (5') for fastening the second end (1.1') of the transmission rod (1) to the rotation module (4') of the driven shaft (3'). Similarly to the first universal joint (5), the second universal joint (5') comprises a connection end (5.1') with a cylindrical configuration corresponding to the connection output (4.1') of the rotation module (4') of the driven rotation shaft (3'). This connection output (4.1') preferably has a grooved cylindrical configuration that facilitates the connection of the second universal joint (5') to the rotation module (4').

At the other end of the second universal joint (5'), it comprises a connection output (5.2') with a square cross section configuration corresponding to the square configuration of the transmission rod (1). The second end (1.1') of the transmission rod (1) is thereby inserted into the connection output (5.2') for fastening by means of a through screw (6) that passes through the through holes (1.2') of the transmission rod (1) and the through holes (5.3') of the connection output (5.2').

There is therefore a connection system of the transmission rod (1) that facilitates assembly, such that, firstly, the first universal joint (5) is fastened to the motorised rotation module (4) by inserting the connection end (5.1) into the grooved cylindrical connection output (4.1). Next, the first end (1.1) of the transmission rod (1) with a square cross section is slidably inserted into the connection output (5.2) with a square cross section, preferably having an adjustment length of about 125 mm. During this process, the transmission rod (1) is inserted abutting against the universal joint (5) in an inclined position, then the rod (1) is arranged in a horizontal position and the rod slides until it is inserted into the second universal joint (5') which will have previously been fastened to the connection output (4.1') of the rotation module (4') of the driven rotation shaft (3').

Once the second end (1.1') of the transmission rod (1) has been inserted into the connection output (5.2') of the second universal joint (5'), it is fastened using a through screw (6) such that it prevents the longitudinal movement of the rod (1) on the connection output (5.2). This configuration allows the use of a single transmission rod (1) and significantly reduces the screws necessary for assembly, resulting in greater ease of assembly and a smooth transmission of movement without the vibrations that could be produced by the misalignment of the various screws used in the joints of known solutions.

Figure 8:
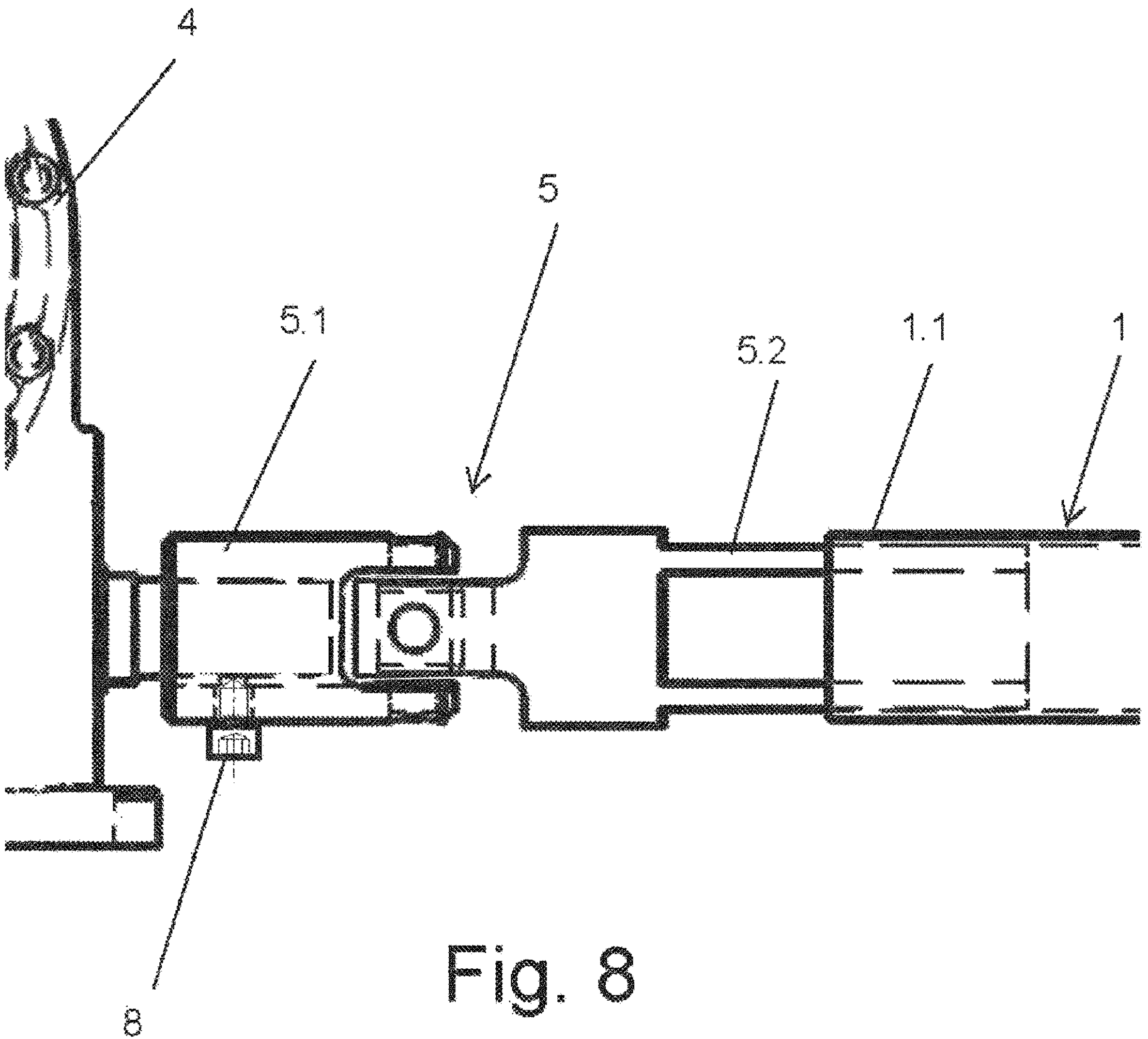
FIG. 8 shows the detailed view of the first universal joint joined to the connection output of the rotation module.

Furthermore, as can be seen in FIG. 8, it is intended for the fastening between the connection end (5.1) of the first universal joint (5) and the connection output (4.1) of the motorised rotation module (4) to be made with a grub screw (8), providing a good disconnection system of the transmission rod (1). In order to perform the disconnection, first, the grub screw (8) is removed, such that the first adjustable universal joint (1) can be released, leaving the through screw (6) of the second universal joint (5'), thus by removing said through screw (6) the transmission rod (1) is disconnected for the replacement or maintenance thereof.

Figure 9A:
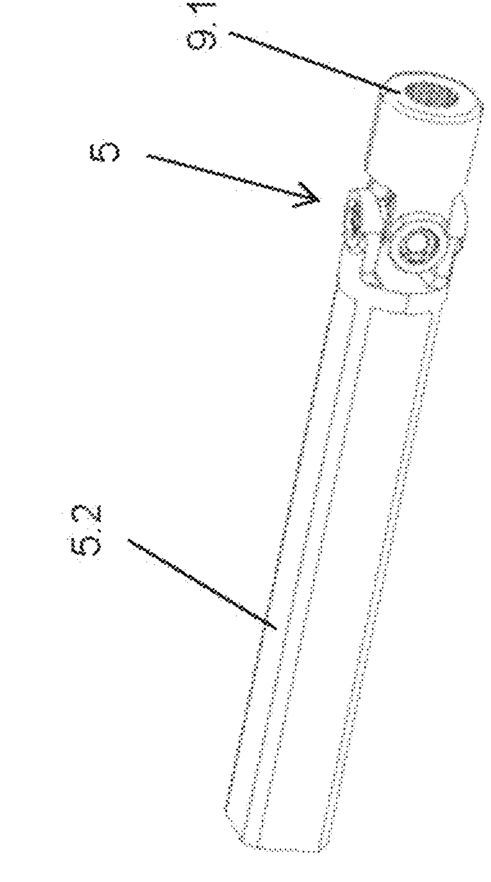
FIG. 9A shows the transmission rod and a universal joint.
Figure 9A:
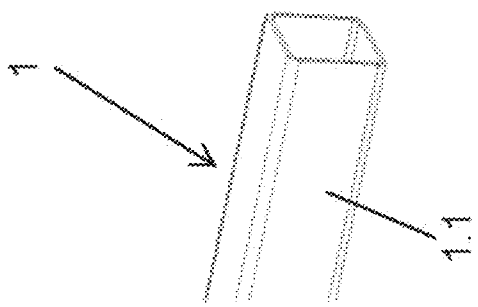
Figure 9B:
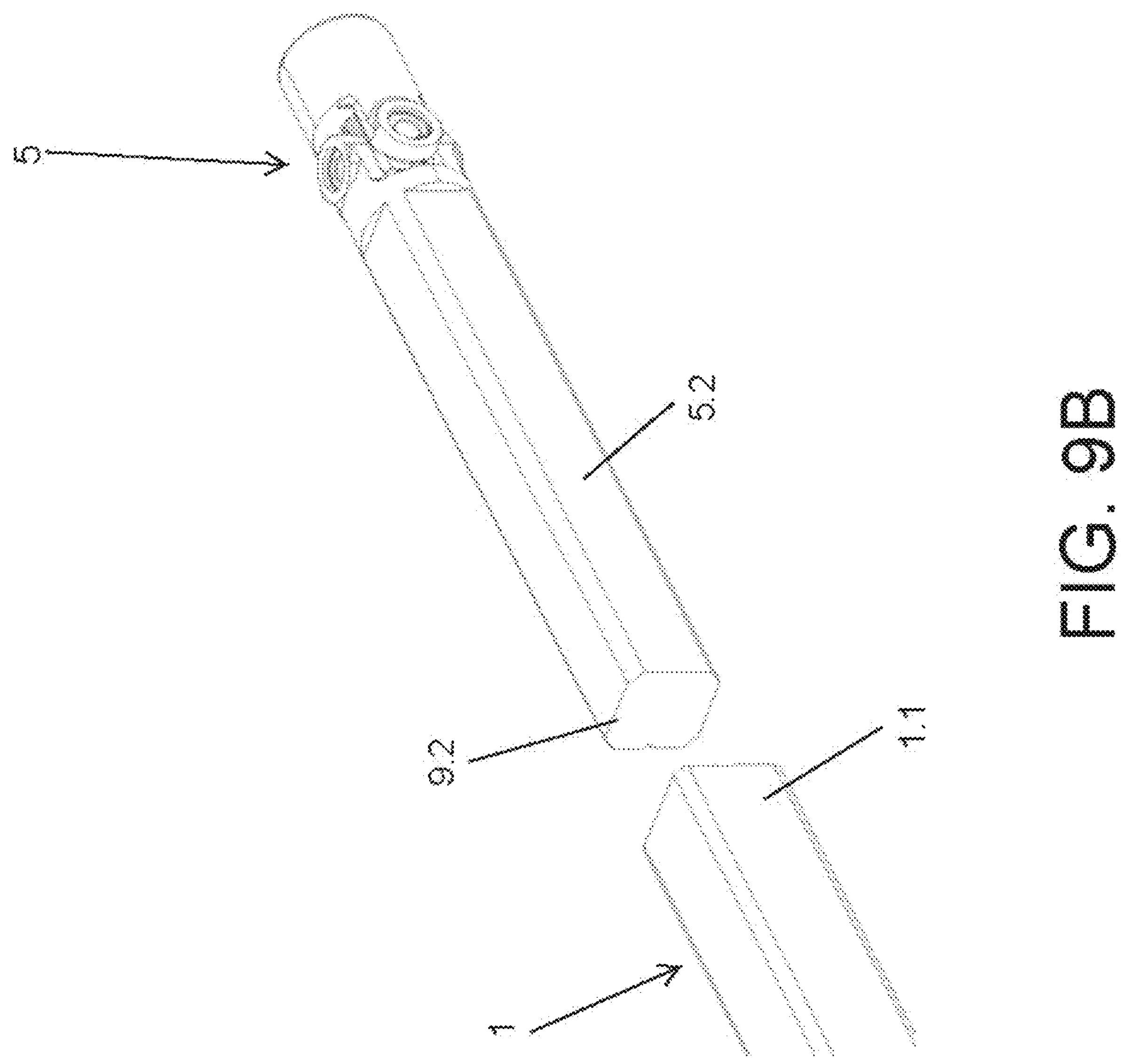
FIG. 9B shows the transmission rod and a universal joint.
Figure 10:
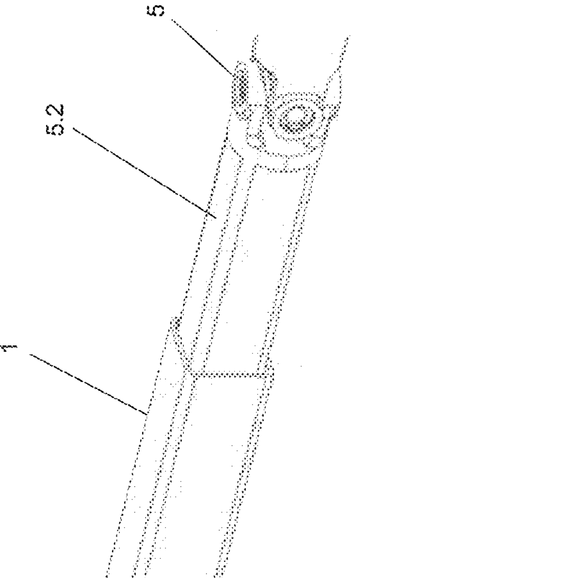
FIG. 10 shows the transmission rod connected to a connection output of a universal joint.

FIG. 9A shows the transmission rod (1) and the universal joint (5). The cylindrical connection output of the universal joint (5) has a circular cross section (9.1). The transmission rod (1) has a square cross section (1.2). FIG. 9B shows the transmission rod (1) and the universal joint (5). The connection output (5.2) of the universal joint (5) has a square cross section (9.2). FIG. 10 shows the connection output (5.2) of the universal joint (5) connected to the transmission rod (1).

The invention claimed is:

1. A solar tracker connection system comprising:

a first rotatable row of solar panels comprising:

a first rotation shaft;

a first set of solar panels coupled to the main rotation shaft;

a first motorized rotation module; and a first universal joint connected to a first connection output of the first rotation module, the first universal joint including a first connection end corresponding to the first connection output and a first tubular connection element having a first polygonal cross-section;

a second rotatable row of solar panels comprising:

a second rotation shaft;

a second set of solar panels coupled to the second rotation shaft;

a second rotation module having no motor; and a second universal joint connected to a second connection output of the second rotation module, the second universal joint including a second connection end corresponding to the second connection output and a second tubular connection element having a second polygonal cross-section; and a transmission rod having a polygonal configuration, the transmission rod having a first end adapted to be longitudinally slidably connectable to the first tubular connection element of the first universal joint connected to the first rotation module and a second end adapted to be fixedly connectable to the second tubular connection element of the second universal joint connected to the second rotation module;

wherein the transmission rod enables the first motorized rotation module of the first row of solar panels to control a movement of the second row of solar panels via the second rotation module.

2. The solar tracker connection system according to claim 1, wherein the second tubular connection element of the second universal joint of the second rotation module is fastened by means of a through screw through a first through hole of the second tubular connection element coinciding with a second through hole of the second end of the transmission rod.

3. The solar tracker connection system according to claim 1, wherein the first universal joint is fastened to the first connection output of the first rotation module by means of a grub screw.

4. A connection system for enabling a first rotation module of a first row of solar panels to control a movement of a second row of solar panels, the connection system comprising:

a transmission rod having a first end and a second end, the first end having a first hollow end portion, the second end having a second hollow end portion;

a first universal joint comprising:

a first connection end having a circular cross section, the first connection end being adapted to receive a first cylindrical connection output of a first rotation module coupled to a first rotation shaft of a solar tracker system; and a first tubular connection end having a square cross section, the first tubular connection end being adapted to fit into and engage with the first hollow end portion of the first end of the transmission rod, wherein the first tubular connection end is adapted to be connected to the first end of the transmission rod and adjustable by application of pressure without any fastening device passing through the first tubular connection end or the transmission rod; and a second universal joint comprising:

a second connection end having a circular cross section, the second connection end being adapted to receive a second cylindrical connection output of a second rotation module coupled to a second rotation shaft of the solar tracker system; and a second tubular connection end having a square cross section, the second tubular connection end being adapted to fit into and engage with the second hollow end portion of the second end of the transmission rod, wherein the second tubular connection end is adapted to be connected to the second end of the transmission rod by means of a screw that passes through a set of holes disposed in the second tubular connection end and in the transmission rod.

* * * * *